(No Model.) 3 Sheets—Sheet 1.
M. JACKER.
MACHINE FOR MAKING CANDY CHAINS.
No. 425,611. Patented Apr. 15, 1890.
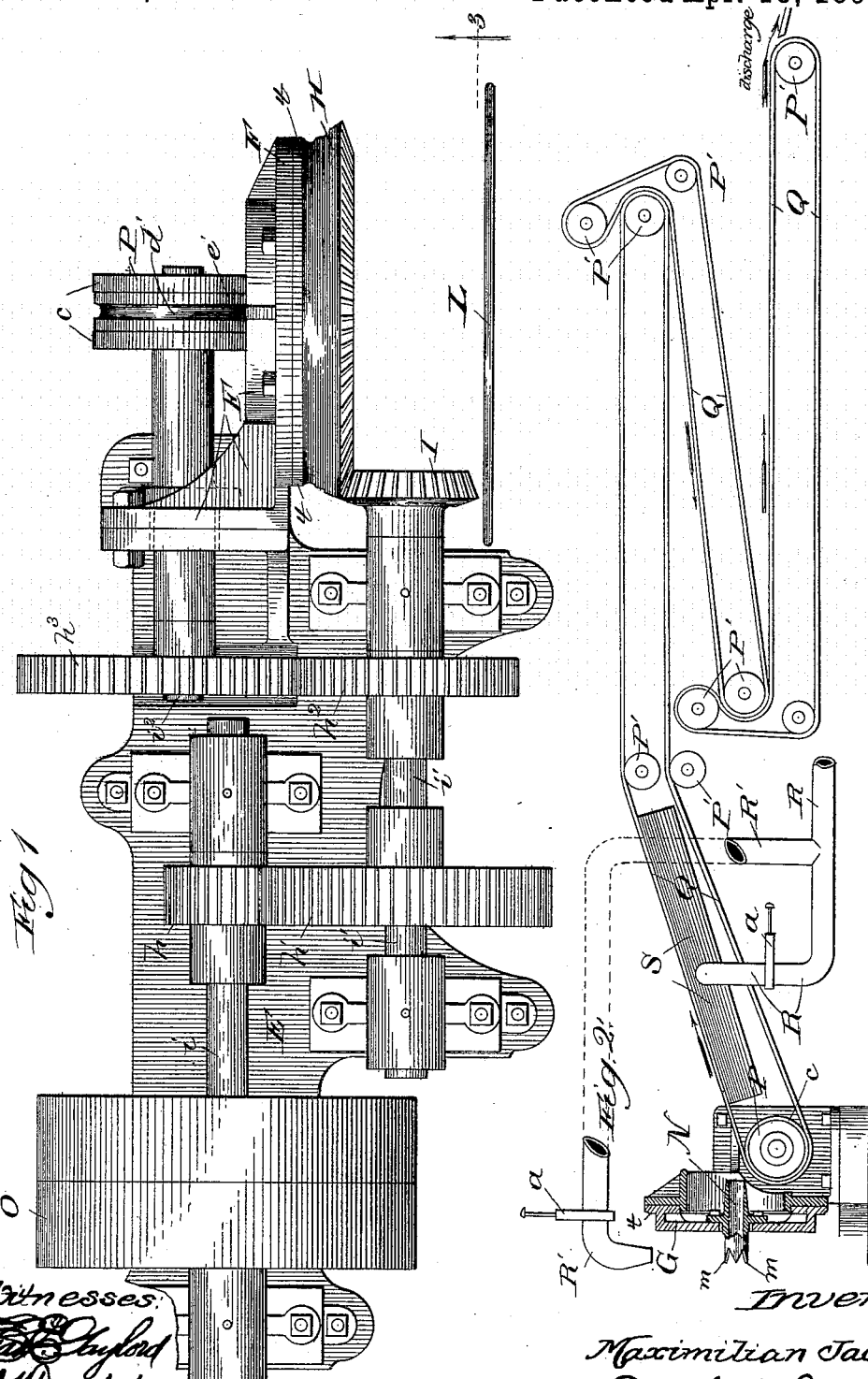

(No Model.) 3 Sheets—Sheet 2.
M. JACKER.
MACHINE FOR MAKING CANDY CHAINS.
No. 425,611. Patented Apr. 15, 1890.
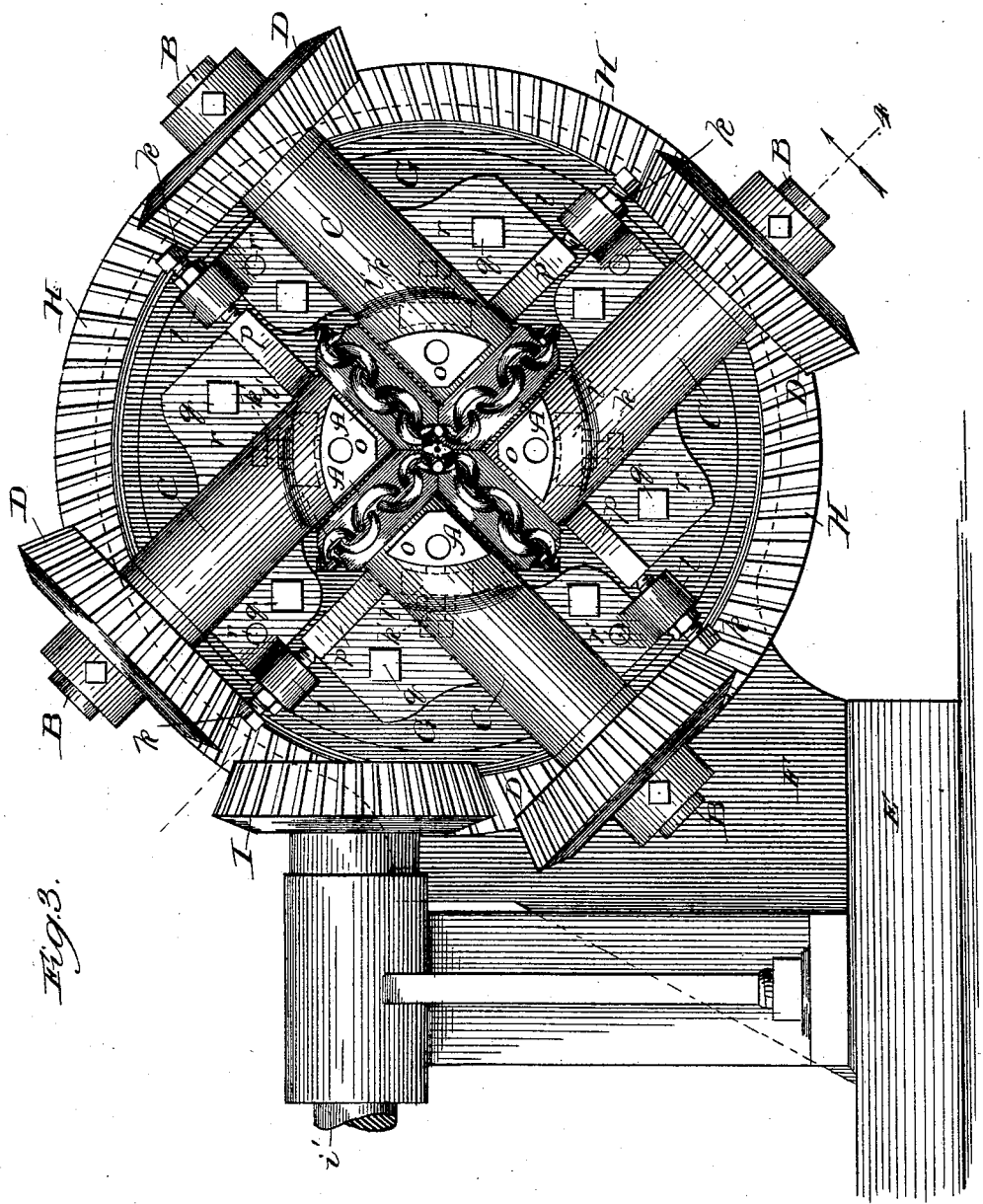

(No Model.) 3 Sheets—Sheet 3.
M. JACKER.
MACHINE FOR MAKING CANDY CHAINS.
No. 425,611. Patented Apr. 15, 1890.
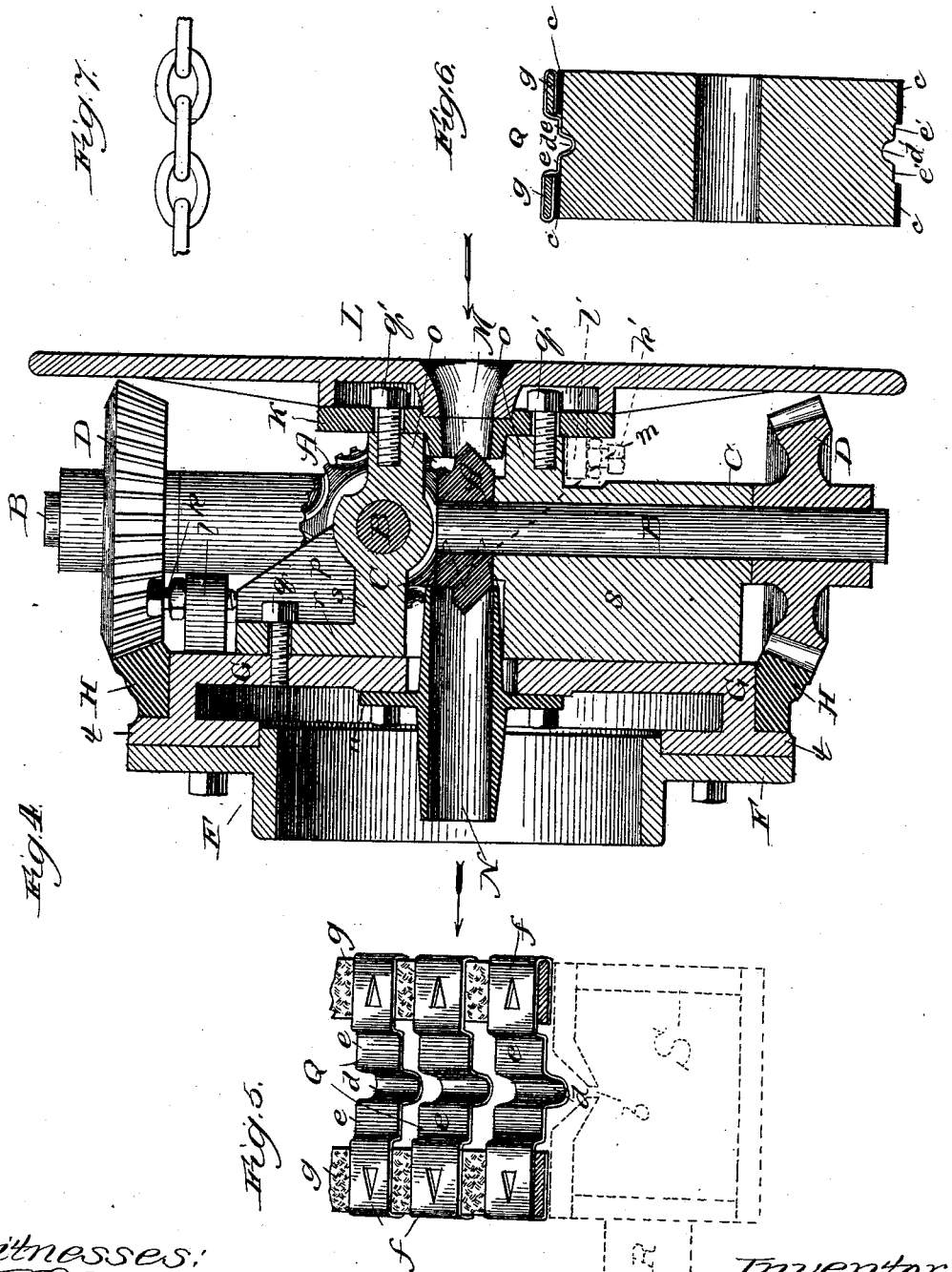

UNITED STATES PATENT OFFICE.

MAXIMILIAN JACKER, OF CHICAGO, ILLINOIS.

MACHINE FOR MAKING CANDY CHAINS.

SPECIFICATION forming part of Letters Patent No. 425,611, dated April 15, 1890.

Application filed September 28, 1889. Serial No. 325,351. (No model.)

*To all whom it may concern:*

Be it known that I, MAXIMILIAN JACKER, a citizen of the United States, residing at Chicago, in the county of Cook and State of Illinois, have invented a new and useful Machine for Making Candy Chains, of which the following is a specification.

The machine which I employ for carrying out my new process embodies the system of four beveled and contiguous die-rollers forming the subject of Letters Patent of the United States No. 339,781, granted to me April 13, 1886, for a weldless-chain machine; and my present invention is therefore limited to those auxiliary features which adapt it to the manufacture of the particular new product which forms a part of my invention.

It will be readily understood that a machine adapted to the manufacture of chains from bars of metal would be wholly inadequate for manufacturing chains from candy, which latter substance, when in the condition in which it must be to be passed through the machine and molded and compressed into the proper form, is in a highly plastic state, from which it passes to a solid or hardened state under cooling influences; and, obviously, if before attaining a certain degree of hardness the links of the chain formed of this material are subjected to any strain their shape will be impaired. The article is one chiefly of ornament, being designed principally for purposes of decoration—as, for example, the decoration of Christmas-trees, shop-windows, confections, cakes, and the like; hence symmetry is a requisite, as well as uniformity in strength and quality.

The essential requisites of a machine for making, successfully, chains from candied sugar are therefore that the links shall be conveyed away from the machine instantly upon their delivery from the rolls at a speed uniform with their progress through the rolls; that during this progressive movement the chain shall rest upon a carrier of such conformation as will prevent the links from becoming misshapen by their own gravity; that all sides of the chain shall be subjected to proper cooling influences, and that these conditions shall continue until the successive links have attained a sufficient degree of hardness to permit them to be deposited without injury. All these conditions are attained by means of the machine represented in the drawings, in which—

Figure 1 is a plan view of the machine with the die-rollers and their immediate driving-shafts and gears omitted; Fig. 2, a view partly in vertical section and partly in side elevation of the discharging and conveying mechanism, together with the air-blast attachment for aiding the cooling; Fig. 3, a vertical section taken on the line 3 of Fig. 1 and viewed in the direction of the arrow, showing particularly the die-rollers with their attendant parts, omitted from Fig. 1; Fig. 4, an oblique section taken on the line 4 of Fig. 3 and viewed in the direction of the arrow; Fig. 5, a perspective view of a fragment of the carrier for the chain, showing, also, in dotted lines the air-blast attachment for aiding the cooling; Fig. 6, a sectional view of one of the carrier-pulleys with the carrier thereon; Fig. 7, a view in elevation of a fragment of the candy chain which is the product of the machine.

The die-rollers are represented by the letter A. In number, construction, relative arrangement, and operation they are in all respects the same as those shown, described, and claimed in my patent, No. 339,781, referred to above, and hence they will require no particular description here. As in the case of my former patent, each die-roller is mounted upon a separate shaft in bearings upon a frame, and to all these shafts a common rotary movement is imparted by gearing which causes opposite die-rollers to move in contrary directions.

The new features which form the subject of the present application begin with the gear mechanism by which the proper rotary movement is imparted alike to all the die-rollers. The shafts carrying the die-rollers are represented by the letter B, and each is mounted in a sleeve-bearing C, extending to the face of the die-roller and carries upon its outer end a fixed beveled gear-wheel D.

E is the bed of the machine, and F is a bracket projecting obliquely upward from the bed. This bracket constitutes the support for all those parts of the machine which are intimately associated with the rolls.

To the inner face of the bracket F is bolted a disk G, and about the periphery of this disk and bearing against a flange $t$ upon the disk is an annular beveled gear-rim H, with which the beveled gear-wheels D engage. The beveled gear-rim H turns freely upon the periphery of the disk G, and it is obvious that when movement is imparted to it the die-rollers must be set concurrently into action, the opposite die-rollers moving in contrary directions, as required. The requisite rotary movement is imparted to the gear-rim H by means of a beveled gear-wheel I, the connection of which with the power-pulley will be more fully described farther on.

Each sleeve-bearing C is firmly secured to the disk G by means of a web $s$, having feet $r\ r'$, which feet are separately fastened to the disk G by bolts $q$. Between the web and the foot $r$ is a strengthening-flange $p$ at the end adjacent to the roll. Upon the opposite side of each sleeve-bearing C near the die-rollers is a sectoral lug $o$, provided with a threaded socket to receive a bolt $q'$, which secures to it a disk K.

Upon the outer face of the disk K a larger disk L is secured, constituting a shield, and through both the disks K and L in line with the meeting-point of the rollers a flaring opening M is formed, which constitutes the feed-passage.

Upon the opposite side, passing through the disk G and bolted thereto through a flange $n$, is a tube N, which constitutes the discharge-passage for the finished chain. It is essential that the inner end of the tube N be in close proximity to the die-rollers, in order that the candy chain may not adhere to and be carried around by the latter, and for this purpose the inner end of the tube is provided with beveled projections $m$, which fit somewhat closely into the beveled recesses formed by the meeting peripheries of the die-rollers. All the parts with which the candy comes into contact should preferably be made of bronze metal.

To give especial stability to the die-rollers, and at the same time to afford means for their original adjustment or subsequent adjustment in the event of wear, setting devices are provided, consisting of lugs $l$, projecting one from each of the feet $r'$, and nut-bolts $k$, passing one through each lug and impinging against the edge of the web $p$, also lugs $l'$, projecting inward from the plate K, one adjacent to each of the lugs $o$, which project from the sleeve-bearings, and nut-bolts $k'$, extending one through each lug $l'$ and impinging against the lugs $o$, as indicated by dotted lines in Figs. 3 and 4. To permit the limited adjustment which this construction is intended to afford, the bolts $q$, which secure the sleeve-bearings to the disk G, and the bolts $q'$, which secure them to the plate K, are given slight play, as shown in the drawings.

It is essential that the carrier which removes the finished chain shall produce neither slack in the chain nor strain upon it; therefore the chain must be taken away by the carrier at a speed just equal to that at which it is delivered from the die-rollers. For this purpose the carrier and die-rollers are operated from a single train of gearing deriving movement from the common power-pulley O. The gearing is clearly shown in Fig. 1, in which $i$ is the power-shaft, $h$ a pinion thereon, and $h'$ a gear-wheel mounted on a shaft $i'$ and meshing with the pinion $h$. The shaft $i'$ carries upon its end the beveled gear-wheel I, which drives the beveled gear-rim H; and it is provided with a pinion $h^2$, meshing with a gear-wheel $h^3$ upon a shaft $i^2$, which carries upon its outer end the initial carrier-pulley P.

The carrier Q is formed in endless sections, as will be described further on, and each section consists of two bands $g$ of flexible material, carrying cross-strips $f$ of metal firmly secured to them, each cross-strip having a depression $e$ to receive the horizontal links of the chain and an additional and deeper depression $d$ along its center to receive the vertical links of the chain.

The carrier-pulley P is provided with corresponding depressions $e'$ and $d'$ about its periphery to permit it to conform accurately to the carrier. To prevent slipping of the carrier, it is preferred to provide the pulley P with a covering $c$, of india-rubber.

When the chain is delivered from the die-rollers upon the carrier, it might of course be carried forward continuously in one direction until it should become sufficiently hard and be then deposited; but this is less desirable than the plan which I employ, which is to deliver the chain from one to another of a series of carriers one below another and moving always with uniform speed, since by the latter plan not only is space economized, but opposite faces of the chain become alternately exposed wholly to the atmosphere with each reversal, and, in addition to this, the first reversal serves to break a thin fin of candy, which is left by the die-rollers between the consecutive links, thereby completing the formation of the chain.

The construction which I employ is clearly shown in Fig. 2, in which the carrier is represented as being formed in three sections, though, obviously, this number may be increased or diminished at will. The separate sections are mounted upon guide-pulleys P', each having the same peripheral depressions as the pulley P to conform accurately to the carrier. These guide-pulleys are so mounted in their bearings as to cause the ends of the separate sections to overlap each other in close contact, so that the movement of the first section shall be imparted to all the others.

In operation, the sugar from which the candy chain is to be formed, reduced to a plastic condition by heat in the usual manner, is fed into the flaring opening M. For this purpose a portion is drawn out undetached and pressed by the hands into a strand of the proper size to enter the feed-opening. The die-rollers being in action, the plastic sugar is received by them, compressed into a continuous series of connected links by the matrices, and delivered through the discharge-tube N upon the moving carrier. After the initial insertion of the plastic sugar the feed becomes automatic, or so nearly so as to require but little attention, since the action of the die-rollers continually spins out the proper quantity in a strand from the mass.

It is an advantage, especially during the hot season, to subject the finished chain to artificial cooling by suitable agencies. For this purpose I commonly employ an air-blast from an ordinary blower (not shown) directed through a pipe R into a receptacle S, provided with a longitudinal slot $b$ in its upper side, upon which the carrier travels for a portion of its length, the projecting parts of the carrier entering the slot, which has its upper portion widened to receive them. Thus the cooling-blast is impelled through the interstices of the carrier and chain. A branch pipe R' permits an air-blast to be directed upon the die-rollers in case they become unduly heated. The pipes R and R' are provided with valves $a$, so that either or both may be opened at will.

The chain may be discharged from the carrier into a receptacle or upon a reel, and if the latter is employed it may be run by a belt or gearing from the other gearing of the machine in any suitable and convenient manner.

The section of chain shown in Fig. 7 has plain links—such as would be formed by the matrices of the die-rollers represented in the drawings. It is obvious, however, that the links may be made in a great variety of ornamental designs by giving the desired form to the matrices, and that, if preferred, they need not be all alike, but may be formed in recurring variety.

What I claim as new, and desire to secure by Letters Patent, is—

1. In a machine for making continuous chains from candy, the combination, with the system of die-rollers A and means for supporting and revolving them, of a conveyer to receive the chain from the die-rollers and conduct it away and driving mechanism imparting movement to the conveyer at a rate of speed corresponding with that of the chain when issuing from the die-rollers, substantially as described.

2. In a machine for making continuous chains from candy, the combination, with the system of die-rollers A and means for supporting and revolving them, of a conveyer having depressions corresponding with the projections of the chain to receive the chain from the die-rollers and conduct it away and driving mechanism imparting movement to the carrier at a rate of speed corresponding with that of the chain when issuing from the die-rollers, substantially as described.

3. In a machine for making candy chains, the combination, with the system of die-rollers A and means for supporting and revolving them, of the tube N, supported in the line of discharge from the rollers and having the projections $m$ fitting the beveled recesses formed by the peripheries of the rollers, an endless carrier having depressions to correspond with projecting parts of the chain, and driving mechanism for imparting movement to the carrier at a rate of speed corresponding with that with which the chain issues from the die-rollers, substantially as described.

4. In a machine for making candy chains, the combination, with the die-rollers A and means for supporting and revolving them, of the carrier Q, formed in sections overlapping each other and extending back and forth in alternate directions, and driving mechanism for imparting movement to the carrier at a rate of speed corresponding with that at which the chain issues from the rollers, whereby the chain, after being formed by the die-rollers, is received upon the first section of the carrier, deflected around the terminal pulley thereof, thus breaking the fin of candy left by the rollers between adjacent links, delivered inverted upon the second section, and finally deposited, substantially as described.

5. The combination, with the fixed disk G, of the beveled gear-rim H, revolubly mounted upon the periphery of the disk G, rotary shafts B, mounted in bearings fixed upon the disk G, beveled gear-wheels D, fixed upon the outer ends of the shafts B and meshing with the gear-rim H, die-rollers A, fixed upon the inner ends of the shafts B, and gear-wheel I, connected with the power and meshing with the gear-rim H, substantially as described.

6. The combination, with the fixed disk G, of the beveled gear-rim H, revolubly mounted upon the periphery of the disk G, rotary shafts B, mounted in sleeve-bearings C, adjustably secured to the disk G, beveled gear-wheels D, fixed upon the outer ends of the shafts B and meshing with the gear-rim H, die-rollers A, fixed upon the inner ends of the shafts B, and gear-wheel I, connected with the power and meshing with the gear-rim H, substantially as described.

7. The combination, with the supported disk G and revoluble beveled gear-rim H, mounted upon the periphery thereof, of the sleeve-bearings C, provided upon one side with webs $s$, having flanges bolted to the disk G, and upon the other side with lugs $o$, plate K, bolted to the lugs $o$, and having a central opening for the feed, shafts B, mounted in the sleeve-bearings, die-rollers A, fixed to the inner ends of the shafts B, beveled gear-wheels D, fixed to the outer ends thereof and meshing with the gear-rim H, and beveled gear-wheel I, connected with the power and meshing with the beveled gear-rim H, substantially as described.

8. The combination, with the supported disk G and revoluble gear-rim H, mounted upon the periphery thereof, of the sleeve-bearings C, provided upon one side with lugs o and upon the other side with webs s, having upon their inner ends the feet r and strengthening-flanges p and upon their outer ends the feet r' with the lugs l, bolts q, passing loosely through the feet r and r' and securing them to the disk G, nut-bolts k', passing through the lugs l and impinging against the edges of the flanges p, plate K, having the lugs l', bolts q', passing loosely through the plate K and securing it to the lugs o, nut-bolts k, passing through the lugs l' and impinging against the lugs o, shafts B, mounted in the sleeve-bearings C, beveled gear-wheels D, fixed to the outer ends of the shafts B, and meshing with the beveled gear-rim H, die-rollers A, fixed to the inner ends of the shafts, and beveled gear-wheel I, connected with the power and meshing with the gear-rim H, substantially as described.

9. In combination with the supported disk G, having upon its periphery the gear-rim H, shafts B, mounted in bearings upon the disk G, and carrying upon their inner ends the die-rollers A and upon their outer ends the gear-wheels D, meshing with the gear-rim H, and gear-wheel I, mounted on a shaft in bearings and meshing with the gear-rim H, the driving-pulley P for the carrier, mounted upon a shaft in bearings in position to receive the chain as it emerges from the discharge-opening, a power pulley and shaft, and connected gearing connecting the power-shaft with both the gear-wheel I and pulley P, substantially as described.

10. In a machine for making candy chains, the combination, with the die-rollers A, mechanism for supporting and driving them, a traveling carrier receiving the chain from the die-rollers, and mechanism for imparting movement to the carrier at a rate of speed corresponding with that with which the chain issues from the die-rollers, of an artificial cooling device for cooling the chain as it is advanced by the carrier, substantially as described.

11. In a machine for making candy chains, the combination, with the die-rollers A, mechanism for supporting and driving them, and traveling carrier Q, receiving the chain from the die-rollers, of the slotted receptacle S, over which the carrier moves, and air-blast pipe R, entering the receptacle S, substantially as described.

12. In a machine for making candy chains, the combination, with the die-rollers A, mechanism for supporting and driving them, and traveling carrier Q, receiving the chain from the die-rollers, of the slotted receptacle S, over which the carrier moves, and valved air-blast pipes R and R', leading the one into the receptacle S and the other to the die-rollers, substantially as described.

13. The carrier-belt formed of the flexible bands g, in combination with the metal cross-plates f, having the depressions e and d, substantially as described.

MAXIMILIAN JACKER.

In presence of—
J. W. DYRENFORTH,
M. J. FROST.